(No Model.) 6 Sheets—Sheet 1.

J. G. REBER & J. L. SEFTON.
EGG CASE.

No. 500,296. Patented June 27, 1893.

Witnesses
W. C. Coolies
John W. Adams.

Inventors
John G. Reber
John L. Sefton
by Edward Rector
their atty.

(No Model.) 6 Sheets—Sheet 2.

J. G. REBER & J. L. SEFTON.
EGG CASE.

No. 500,296. Patented June 27, 1893.

Witnesses
W. C. Coolic
John W. Adams.

Inventors
John G. Reber &
John L. Sefton
by Edward Rector
their atty.

(No Model.) 6 Sheets—Sheet 3.

J. G. REBER & J. L. SEFTON.
EGG CASE.

No. 500,296. Patented June 27, 1893.

Witnesses
W. C. Coolies
John W. Adams.

Inventors
John G. Reber and
John L. Sefton
by Edward Rector
their attys (No Model.) 6 Sheets—Sheet 5.
J. G. REBER & J. L. SEFTON.
EGG CASE.
No. 500,296. Patented June 27, 1893.
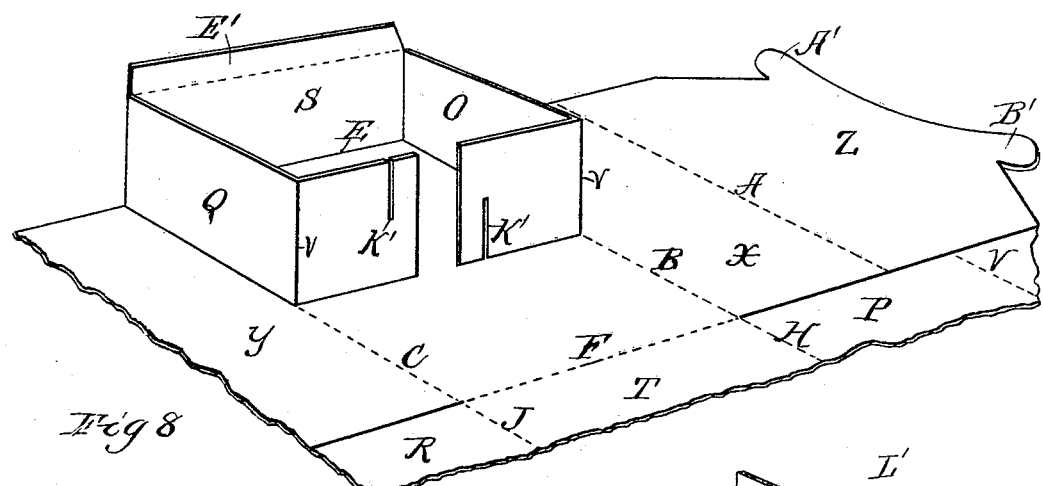
Fig 8.
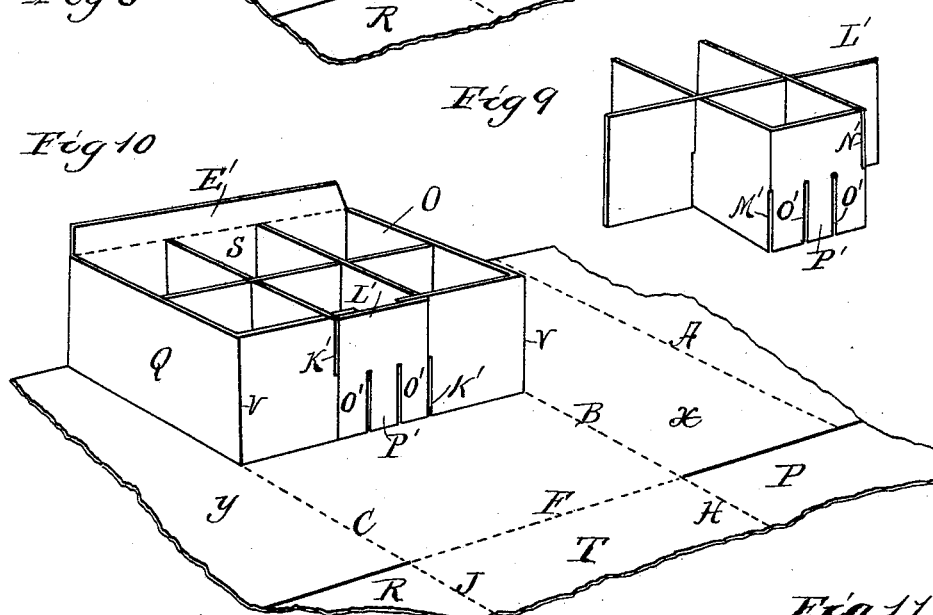
Fig 9.
Fig 10.
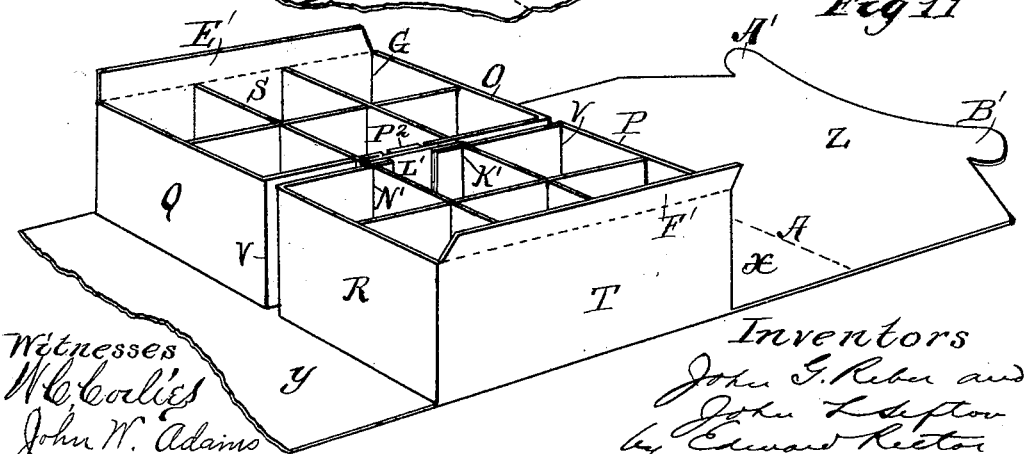
Fig 11.
Witnesses
W. C. Coolies
John W. Adams
Inventors
John G. Reber and
John L. Sefton
by Edward Rector
their atty.

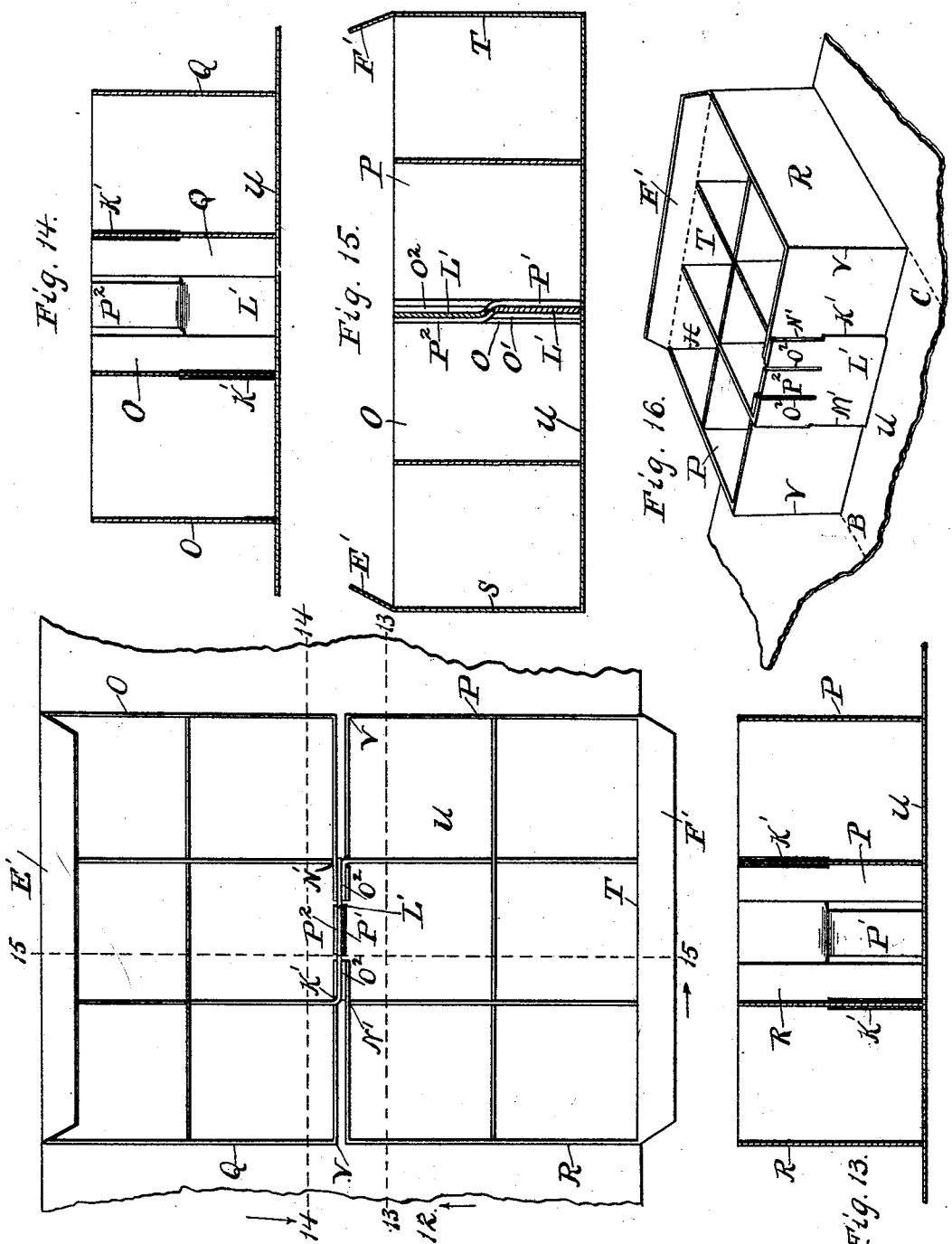

UNITED STATES PATENT OFFICE.

JOHN G. REBER AND JOHN L. SEFTON, OF CHICAGO, ILLINOIS.

EGG-CASE.

SPECIFICATION forming part of Letters Patent No. 500,296, dated June 27, 1893.

Application filed April 26, 1892. Serial No. 430,743. (No model.)

*To all whom it may concern:*

Be it known that we, JOHN G. REBER and JOHN L. SEFTON, both citizens of the United States, residing at Chicago, in the county of Cook and State of Illinois, have invented certain new and useful Improvements in Egg-Cases, of which the following is a description, reference being had to the accompanying drawings, forming part of this specification.

Our invention relates to that class of egg cases which are used chiefly by retail grocers and others who sell eggs in small quantities. They are formed from a box or case folded from a flexible blank, such as paper or pasteboard, and having suitable partitions fitted into them to subdivide their interior into separate egg cells. In these respects they are of the same general character as those shown and described in our pending application, Serial No. 429,347, filed April 15, 1892.

The novelty of our present invention will be hereinafter set forth and specifically pointed out in the claims.

Figure 1:
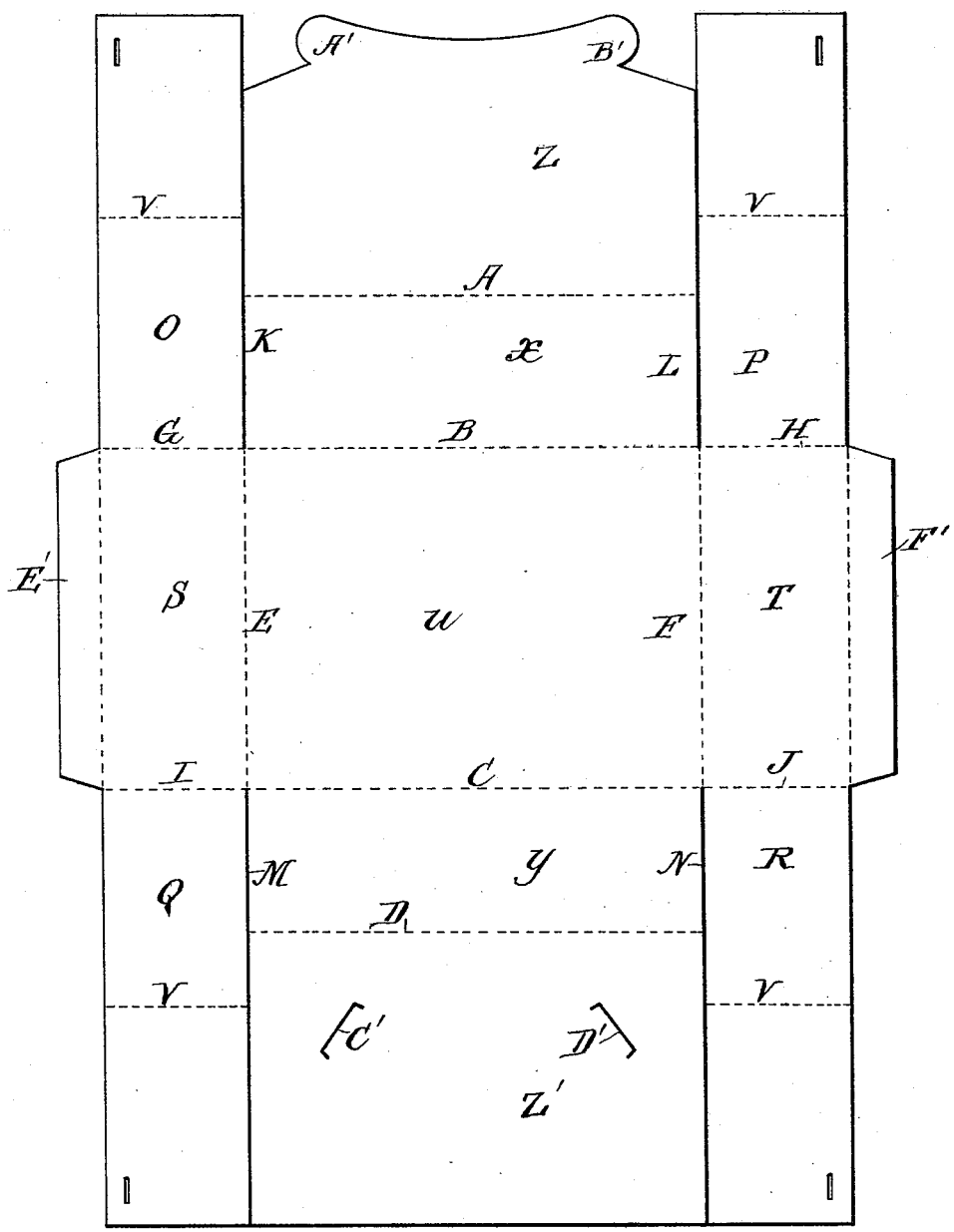
Figure 2:
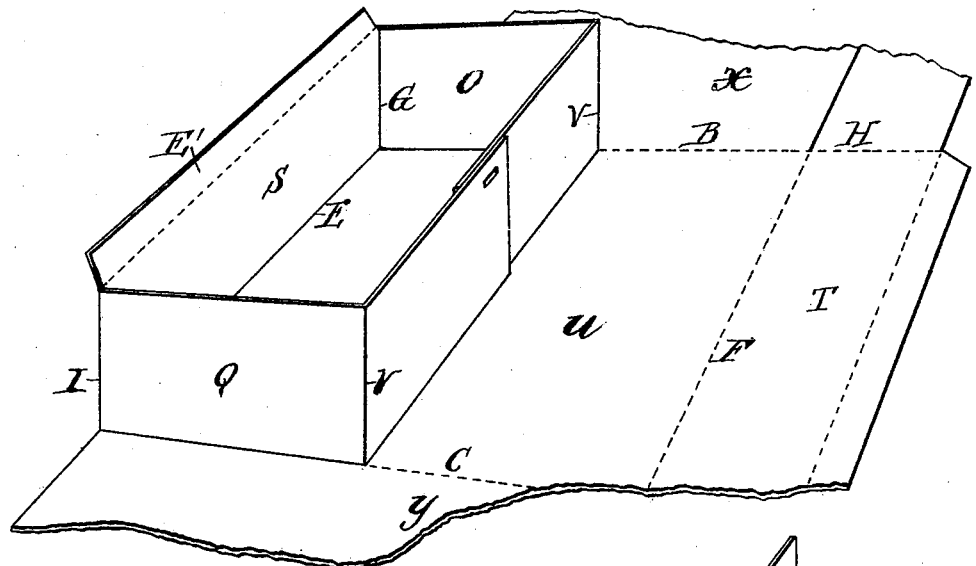
Figure 3:
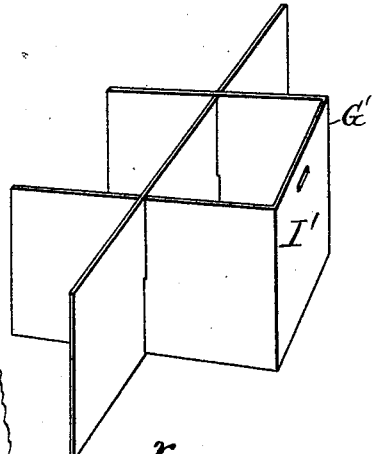
Figure 4:
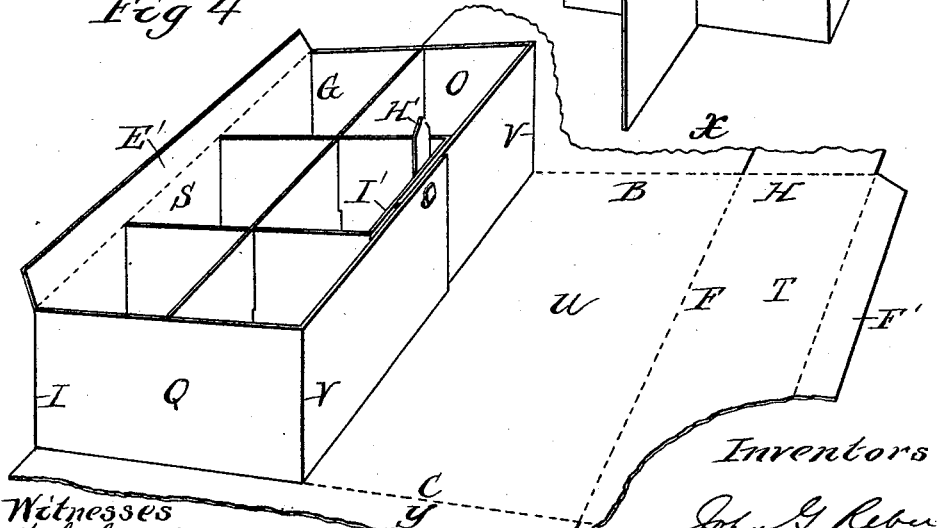
Figure 5:
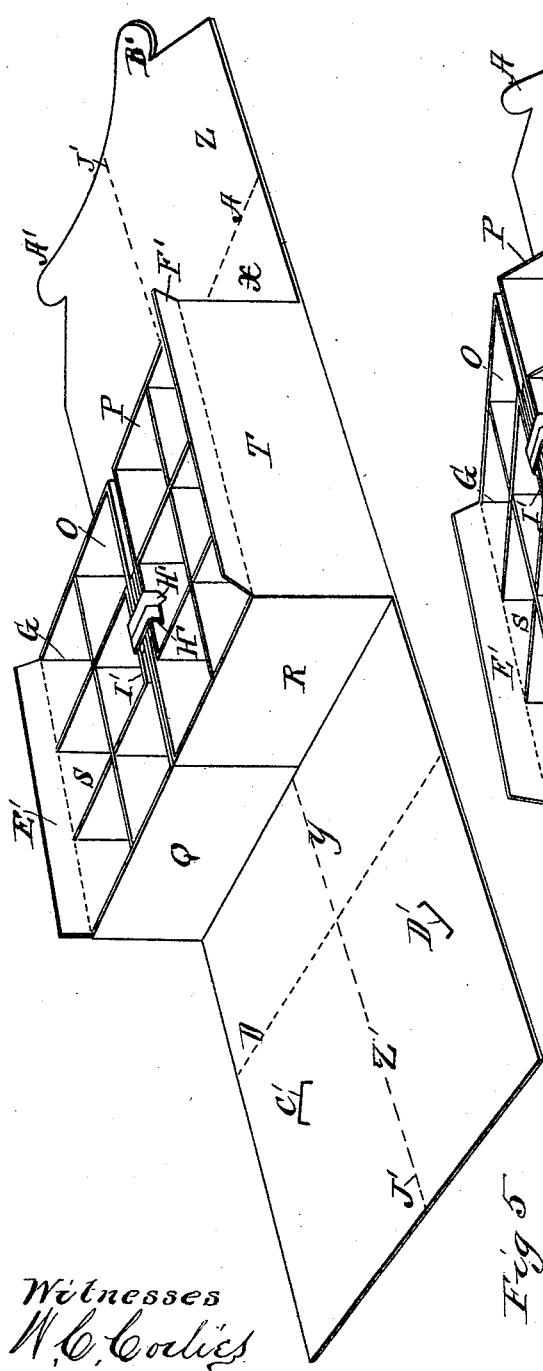
Figure 6:
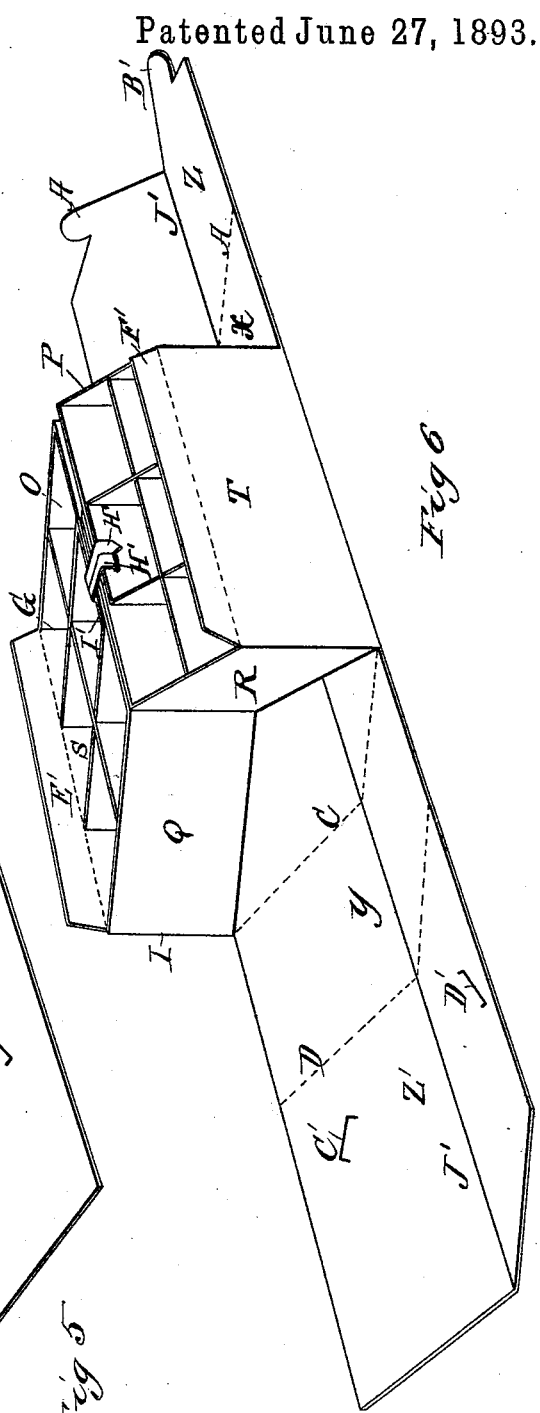
Figure 7:
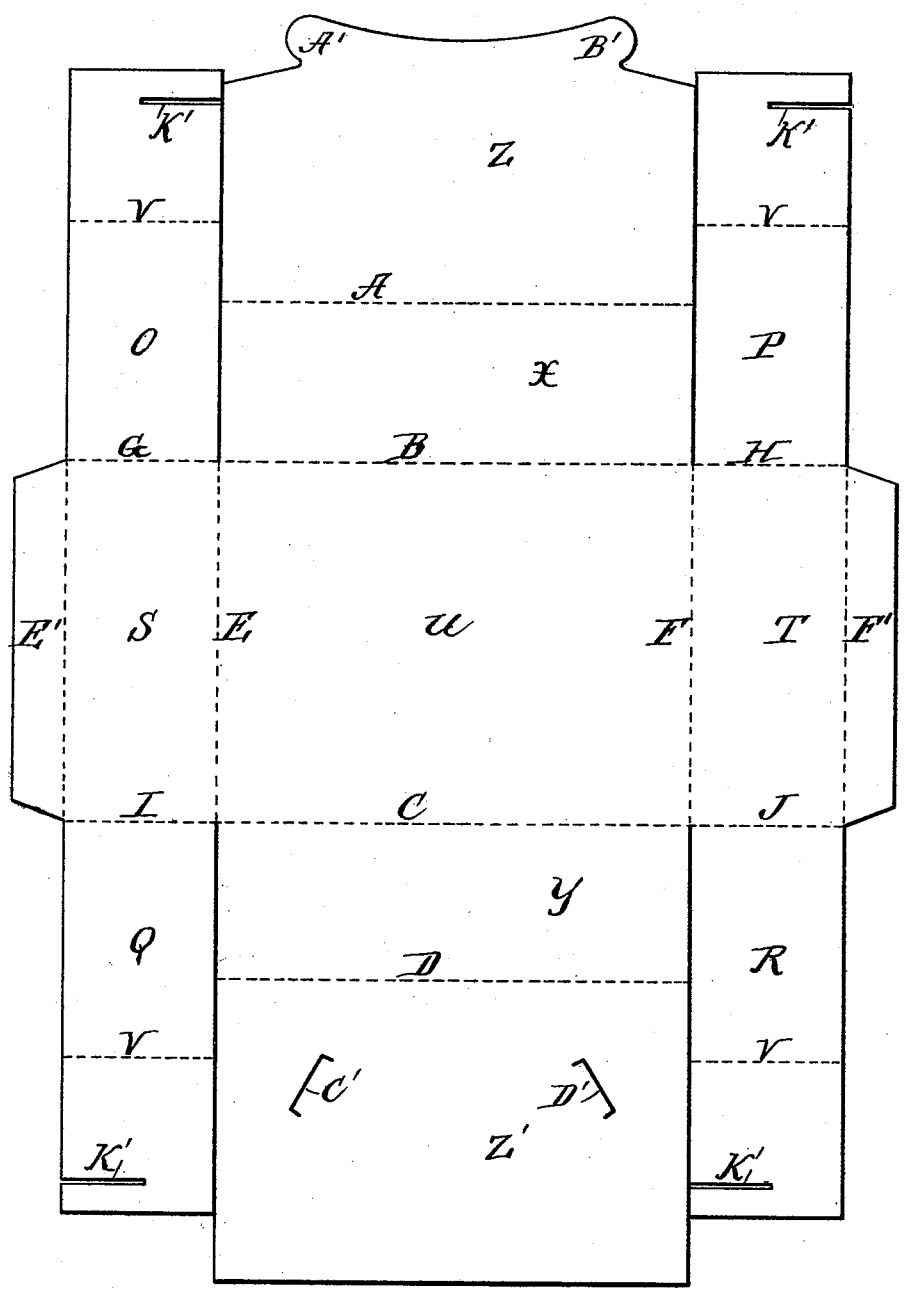

In the accompanying drawings Figure 1 represents a plan view of a blank from which the box for one form of our new egg case may be folded; Fig. 2 a detail perspective of the middle portion of the blank, showing the side, end and middle walls of one-half of the box folded into position; Fig. 3 a perspective view of a set of partitions adapted to be fitted into the half of the box shown in Fig. 2; Fig. 4 a detail perspective of the half of the box shown in Fig. 2, with the set of partitions shown in Fig. 3 fitted into it and secured to the overlapped ends of the flaps which form half of the middle division wall of the box; Fig. 5 a perspective view of the whole egg case, with the compartments containing the partitions fastened together by means of the metal clamps, the portions of the blank forming the outer side walls and the cover flaps being left flat; Fig. 6 a perspective view of the complete case shown in Fig. 5, showing how it may be folded into flat shape for shipment; Fig. 7 a plan view of a blank adapted to be folded into box form in substantially the same manner as that shown in Fig. 1, but provided with different means for attaching the two sets of partitions to the middle wall of the box, and for fastening such walls together; Fig. 8 a detail perspective of a portion of the blank showing the walls forming one-half of the box folded into position; Fig. 9 a perspective view of a set of partitions adapted to be fitted into the box shown in Fig. 8 and interlocked with the ends of the flaps forming its right hand side, to secure said partitions to the flaps and to connect the latter with each other; Fig. 10 a detail perspective of the box shown in Fig. 8 with the partitions fitted in and secured to it; Fig. 11 a perspective of the complete egg case, a portion of one of the flaps being broken away; Fig. 12 a top plan view of the case with the ends of the flaps broken away; Figs. 13, 14 and 15 vertical sections on the line 13—13, 14—14, and 15—15 of Fig. 12, respectively; and Fig. 16 a perspective view of the opposite half of the box from that shown in Fig. 10.

The same letters of reference are used to indicate identical parts in all the figures.

The blank shown in Fig. 1 is creased upon the lines A, B, C, D, E, F, G, H, I and J, and cut upon the lines K, L, M and N. Each of the flaps O, P, Q and R is also creased transversely near its middle upon the line V. In forming the box from this blank each of the side strips of the blank, which are separated from the middle portion of the blank by the cuts K M and connecting crease E, and the cuts L N and connecting crease F, respectively, are bent upward to vertical position, hinging on the creases E F. Then the ends of the flaps O, P, Q and R are bent inward at right angles, hinging on the creases V. Then these flaps are successively bent inward at right angles along the creases G, H, I and J. This brings the flaps O and Q to the position shown in Fig. 2 with their ends overlapping each other along the middle line of the bottom portion U of the blank. The flaps P R will occupy a corresponding position, and their overlapped ends will abut against the ends of the flaps O Q, along the middle line of the blank, and together form a middle division wall in the box, as seen in Fig. 5. Then a set of partitions G', such as shown in Fig. 3, is fitted into the half of the box shown in Fig. 2. Then a metal clamp H' is passed through the overlapped ends of the flaps O Q and through the wall I' of the set of partitions G' which fits against the inner face of the wall formed by the overlapped ends of the flaps O Q, as seen in Fig. 4. This metal clamp is clinched in a suitable manner and one end of it projects above the upper edge of the box. A similar set of partitions is fitted into the opposite half of the box and secured to the overlapped ends of the flaps P R by a metal clamp similar to the clamp H' in Fig. 4. To fasten the two halves of the box together, to form the complete egg case, the clamp H' in Fig. 4 is bent to the right and down over the ends of all of the flaps and the walls of the partitions fitting against them, while the metal clamp on the opposite half of the box is bent to the left and down over all of the flaps and the partition walls fitting against them, as seen in Fig. 5. This forms the complete egg case, ready to be filled with a dozen eggs. To close the case, the narrow side flaps E' F' are bent inward and downward to horizontal position. Then the ends of the middle portion of the blank are bent upward to vertical position along the creases B C, the portions X Y between the creases A B and C D, respectively, forming the outer side walls of the box; and then the end flaps Z Z' are bent downward over the box to form its cover, and secured in place in any suitable manner, as by the tongues A' B' on the flap Z fitting into the slits C' D' in the flap Z'.

For the purpose of shipping these egg cases it is desirable to fold or compress them into substantially flat shape in order that they may be packed in a small space. To this end the two halves of the case may be left disconnected along the middle wall by leaving the metal clamps unbent, as seen in Fig. 4. In such case each half of the box can be collapsed longitudinally of the blank and folded over upon the middle portion of the blank along the creases E F, and the case thus be shipped flat in a package of substantially the same width as the middle portion of the blank. Instead, however, of disconnecting the two halves of the case, or leaving them disconnected originally, as before described, the blank may be provided with a middle longitudinal crease or line of fold J'—J', along which the case shown in Fig. 5 may be folded together in the manner indicated in Fig. 6, without disconnecting the two halves of the box. In this manner the complete cases may be shipped flat in a package of about half the width of the blank shown in Fig. 1, and when the cases are to be unpacked and used it is only necessary to flatten out the middle portion of the blank along the line J'—J', whereupon the cells will resume the position shown in Fig. 5 and the case will be in condition for immediate use.

The blank shown in Fig. 7 is substantially the same as the blank shown in Fig. 1, excepting that the flaps O, P, Q and R are somewhat shorter than those in Fig. 1, and are provided with slits K', as shown. In forming the egg case from this blank each half of the box is first folded to the position of the half shown in Fig. 8. In this position the ends of the flaps O Q are adapted to have interlocked with them a set of partitions L' such as shown in Fig. 9. This set of partitions is provided with a slit M' which co-operates with the slit K' in the flap Q, and with a slit N' which co-operates with the slit K' in the flap O, all as seen in Fig. 10. The wall of the partition L' which fits against the inner sides of the ends of the flaps O Q is also provided with two slits O' extending upward from its lower edge and forming between them a tongue P', Fig. 9. A similar set of partitions is fitted in the opposite half of the box and interlocked with the ends of the flaps P R as seen in Fig. 16. This set of partitions also has a tongue $P^2$ formed by slits $Q^2$ extending downward from the upper edge of the portion which fits against the inner faces of the flaps P R. The two halves of the box are locked together by the tongues P' and $P^2$ in the manner shown in Figs. 11, 12 and 16.

The case shown in Fig. 12 may be folded flat for shipment in either of the ways described in connection with the case shown in Fig. 6.

The egg case illustrated in Fig. 6 is shown and described in our aforesaid application but not specifically claimed therein. To this extent, therefore, our present application is a division of the former one.

Having thus fully described our invention, we claim—

1. The herein described egg-case: composed of a double-compartment closed box having its bottom, side walls, end walls, cover, and its partition or division wall all folded from a single blank, said division wall being composed of extensions of the end walls bent across the bottom of the box parallel with said end walls, in combination with the two sets of partitions G' fitted into the respective compartments and connected to the division wall, substantially as described.

2. The herein described egg-case: composed of a double-compartment closed box having its bottom, side walls, end walls, cover, and its partition or division wall all folded from a single blank, said division wall being composed of extensions of the end walls bent across the bottom of the box parallel with said end walls, in combination with the two sets of partitions G' fitted into the respective compartments and fastened to the division wall by the metal clamps H', substantially as described.

3. The herein described egg-case: composed of a double-compartment closed box having its bottom, side walls, end walls, cover, and its partition or division wall all folded from a single blank, said division wall being composed of extensions of the end walls bent across the bottom of the box parallel with said end walls, in combination with the two sets of partitions G' fitted into the respective compartments and fastened to the division wall by the metal clamps H', said clamps also serving to fasten the two halves of said wall together, substantially as described.

4. The herein described egg-case: composed of a double-compartment closed box having the bottom portion U, the side and end walls X Y and S T bent upwardly therefrom along the lines B C and E F, the cover flaps Z Z' hinged upon the side walls X Y, the flaps O P Q R hinged upon the end walls S T and having their outer ends bent upon the creases V and extended across the bottom portion U of the box parallel with the end walls S T to form the middle division wall of the box, in combination with the two sets of partitions G' fitted into the respective compartments and connected to the division wall, substantially as described.

JOHN G. REBER.
JOHN L. SEFTON.

Witnesses:
EDWARD RECTOR,
ALBERT H. MEADS.